United States Patent [19]
Choi

[11] Patent Number: 5,715,138
[45] Date of Patent: Feb. 3, 1998

[54] APPARATUS FOR PROVIDING A DISPLAY WITH TILTING AND ROTATING MOVEMENTS WITH RACK, PINION, AND BEVEL GEARS

[75] Inventor: Yong-Hwan Choi, Seoul, Rep. of Korea

[73] Assignee: Daewoo Electronics Co., Ltd., Seoul, Rep. of Korea

[21] Appl. No.: 733,550

[22] Filed: Oct. 18, 1996

[30] Foreign Application Priority Data

Oct. 19, 1995 [KR] Rep. of Korea ............... 95-36211

[51] Int. Cl.[6] ...................................................... G06F 1/16
[52] U.S. Cl. ............................................. 361/681; 248/923
[58] Field of Search .............. 364/708.1; 248/917–923, 248/404, 292.12; 361/681–683

[56] References Cited

U.S. PATENT DOCUMENTS

| | | |
|---|---|---|
| 4,549,710 | 10/1985 | Prince et al. |
| 4,554,590 | 11/1985 | Chelin et al. |
| 4,616,218 | 10/1986 | Bailey et al. ................. 248/920 X |
| 4,690,362 | 9/1987 | Helgeland ..................... 248/920 X |
| 4,905,543 | 3/1990 | Choi ............................. 248/922 X |
| 5,124,805 | 6/1992 | Chung et al. |

FOREIGN PATENT DOCUMENTS

| | | |
|---|---|---|
| 0 312 355 | 4/1989 | European Pat. Off. |
| 0 546 477 | 6/1993 | European Pat. Off. |
| 2607219 | 5/1988 | France .......................... 248/404 |
| 2 206 464 | 1/1989 | United Kingdom. |
| 9 301 700 | 1/1993 | WIPO. |

*Primary Examiner*—Michael W. Phillips
*Attorney, Agent, or Firm*—Pennie and Edmonds, LLP

[57] ABSTRACT

An apparatus for providing tilting and rotational movements of a display panel includes a first device for tilting the display panel toward or away from the viewer, a second device for rotating the display panel in sidewise directions, and a member connecting the first and the second devices. The first device has a pinion for driving the display panel and a unit for conveying the power from the pinion to the display panel, and the second device has a bevel gear for driving the display panel and a unit for conveying the power from the bevel gear to the display panel via the connecting member, thereby providing tilting movement of a visual display panel toward or away from a viewer and rotational movement thereof in sidewise directions.

16 Claims, 2 Drawing Sheets

APPARATUS FOR PROVIDING A DISPLAY WITH TILTING AND ROTATING MOVEMENTS WITH RACK, PINION, AND BEVEL GEARS

FIELD OF THE INVENTION

The present invention relates to a visual display system; and more particularly, to an apparatus capable of providing tilting movement of a visual display panel therein toward or away from the viewer and in sidewise rotational directions.

BACKGROUND OF THE INVENTION

Visual display terminals are often required to be viewed by viewers under various different conditions, i.e., under various different angles and lighting conditions. One of the problems faced by the viewers in viewing the terminals is the difficulty in appropriately positioning the display terminals so that the display can be easily and clearly viewed. A number of mounting mechanisms have been developed for adjusting the position of relatively large and bulky display terminals such as cathode ray tube terminals. However, advances in technology allowed the bulky cathode ray tube terminals to be replaced by terminals which are lighter and occupy less space, e.g., flat terminals such as liquid crystal displays ("LCD") or plasma display panels ("PDP"). The flat terminals are usually installed in housing units which are essentially flat and do not have the weight distribution normally found in the cathode ray tube display terminals. Consequently, the various mechanism devised for the cathode ray tube terminals often is of no use in the flat terminals.

There is shown in FIG. 1, a tilt angle adjusting apparatus disclosed by Robert G. Malick in U.S. Pat. No. 4,669,694 capable of allowing the display terminal device to be set to any of a number of tilt angles.

As shown, a tiltable display unit housing 16 is attached by means of a hinge arrangement 15 to a base unit 12 and a tilt adjusting apparatus 10 for controlling the tilt angle of the housing 16. The base unit 12 includes a vertically extending support member 14 and a base unit housing 13 extending generally horizontally. The housing 13 provides support for the vertical member 14 and an enclosure for electronic components. The display unit housing 16 supports a flat display 17 and encloses associated electronic components. A hinge member 18 which is attached to the back wall 6 of housing 16 pivots on a hinge pin 19 of hinge arrangement 15. The tilt adjusting apparatus 10 includes a strut 20 extending from the vertical support member 14 through slot 25 in the back wall 6 of housing 16. The strut 20 may be released from a fixed position in the slot 25 by operation of lever 51, thereby allowing the housing 16 to be tilted about the hinge pin 19. This allows the display unit housing 16 to be tilted forward or backward about the horizontal axis of the hinge arrangement 15.

The tilt angle adjusting apparatus disclosed by Malick has a major shortcoming in that it allows the display unit housing to be tilted only forward or backward about the horizontal axis of the hinge arrangement. In other words, it is incapable of providing sidewise rotational movements of the display unit housing.

SUMMARY OF THE INVENTION

It is, therefore, an object of the present invention to provide an apparatus capable of providing tilting movements of a visual display panel toward or away from the viewer and in sidewise rotational directions.

Another object of the present invention is to provide an apparatus capable of providing movements of a visual display terminal in sidewise rotational directions.

In accordance with one aspect of the present invention, there is provided an apparatus for providing tilting movements of a display panel, comprising: first device for tilting the display panel toward or away from a viewer, second device for tilting the display panel in sidewise rotational directions, and a member for connecting the first and the second devices, wherein the first device includes a pinion for driving the display panel toward or away from the viewer and a unit for conveying a power from the pinion to the display panel, and the second device includes a bevel gear for driving the display panel and a unit for conveying the power from the bevel gear to the display panel via the connecting member.

In accordance with another aspect of the present invention, there is provided an apparatus for providing tilting movements of a display panel, comprising: a driving bevel gear, a driven bevel gear engaged with the driving bevel gear, a member for supporting the display panel, and a member for connecting the driven bevel gear with the supporting member.

BRIEF DESCRIPTION OF THE DRAWINGS

The above and other objects and features of the present invention will become apparent from the following description of preferred embodiments, when taken in conjunction with the accompanying drawings, wherein.

DETAILED DESCRIPTION OF THE PREFERRED EMBODIMENTS

Figure 1:
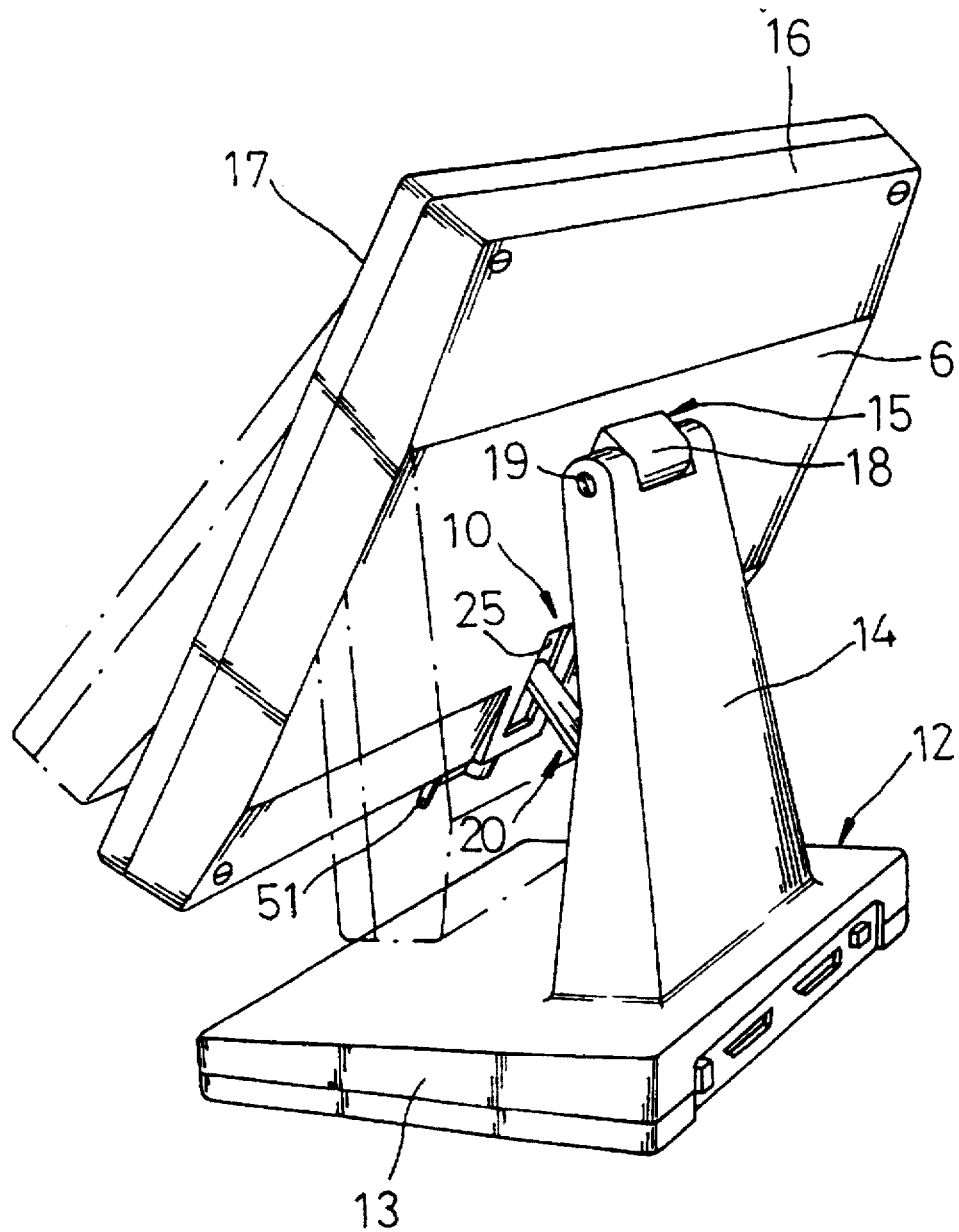
FIG. 1 shows a rear perspective view of a tilt adjusting apparatus previously disclosed.
Figure 2:
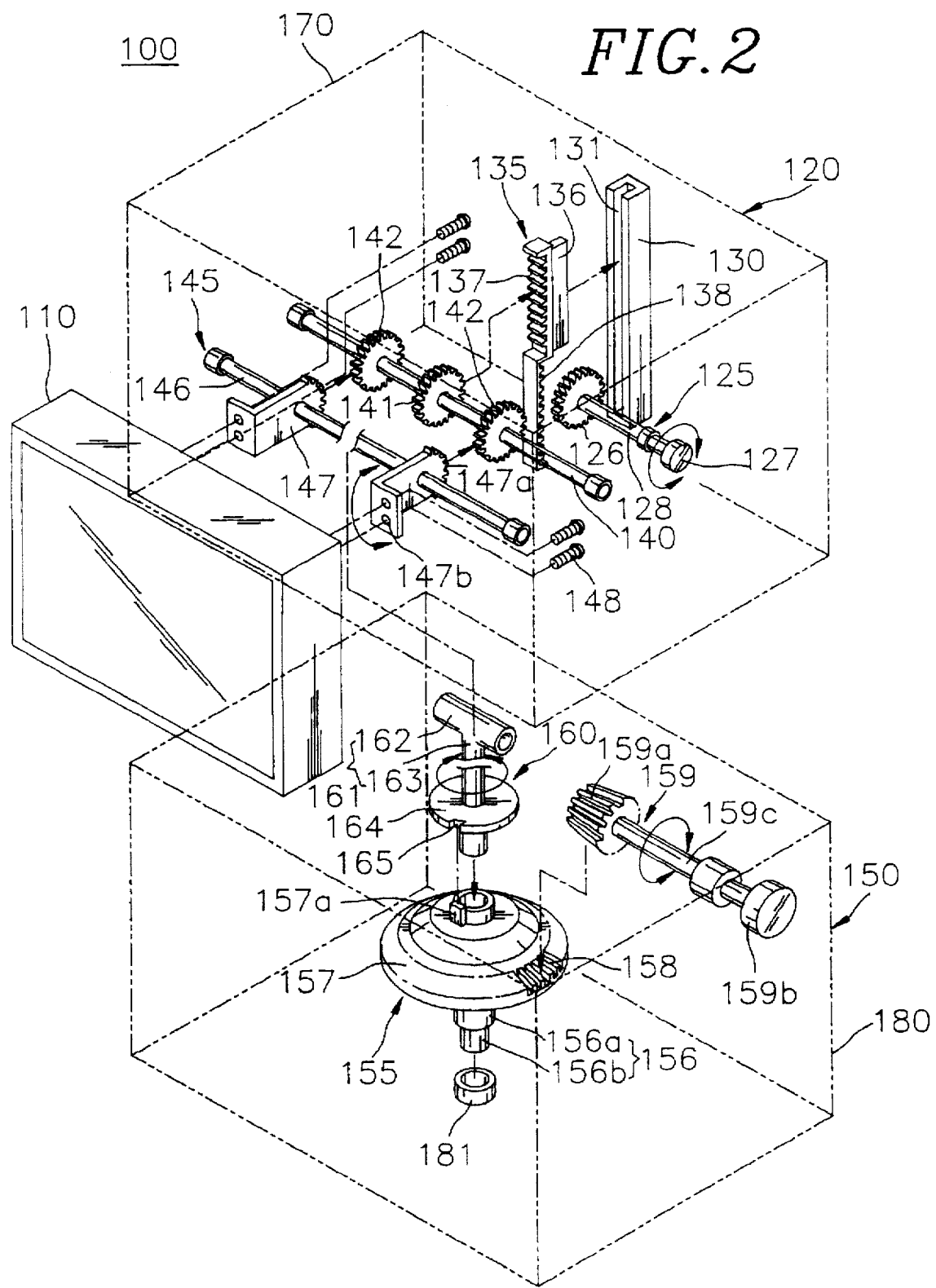
FIG. 2 illustrates an exploded perspective view of the tilting movement providing apparatus in accordance with the present invention.

There is disclosed in FIG. 2, an exploded perspective view of the inventive apparatus 100 capable of providing tilting movement of a visual display panel 110 toward or away from a viewer and in sidewise rotational directions. The apparatus 100 comprises a first device 120 for providing tilting movements of the display panel 110 toward or away from the viewer, a second device 150 for rotating the display panel 110 in sidewise rotational directions, and a member 160 connecting the first and the second devices 120, 150.

The display panel 110 is formed with two pairs of threaded holes (not shown) on its rear surface.

The first device 120 arranged in a first housing 170 includes a pinion 125, a guide member 130, a rack 135, a rotary rod 140, and a supporting member 145.

The pinion 125 has a gear portion 126, a knob 127 and a shaft 128 connecting the pinion gear portion 126 with the pinion knob 127. The pinion knob 127 protrudes out from the first housing 170 so as to allow the knob to be manually twisted.

The guide member 130 fixed on the rear surface of the first housing 170 has an open slot 131, for guiding the motion of the pinion 125.

The rack 135 has a rectangular rib 136 movably inserted into an upper portion of the open slot 131 of the guide member 130, an upper gear portion 137 facing toward the display panel 110 and a lower gear portion 138 engaged with the pinion 125.

The rotary rod 140 around which a power conveying gear 141 and a pair of driving gears 142 are tightly fitted is rotatably fixed in the first housing 170 in such a way that the power conveying gear 141 is engaged with the upper gear portion 137 of the rack 135.

The supporting member 145 for supporting the display panel 110 has a stationary rod 146 fixed in the first housing 170 and a pair of substantially L-shaped pieces 147 rotatably fitted around the stationary rod 146. The connecting member 160 which will be described in detail later is fitted around the stationary rod 146 between the L-shaped pieces 147. Each of the pieces 147 is formed with a gear portion 147a meshed with the driving gear 142 and a pair of through holes 147b. The pair of L-shaped pieces 147 are fixed to a rear surface of the display panel 110 by means of two pair of screws 148 which are screwed into the threaded holes through the through holes 147b of the pieces 147. This arrangement allows the engagement of the display panel 110 with the first device 120.

The second device 150 is arranged in the second housing 180 provided with a cylindrical rib 181 on its bottom surface and includes a driven bevel gear 155 and a driving bevel gear 159.

The driven bevel gear 155 has a hollow cylindrical shaft 156 divided into a portion 156a with a larger diameter and a portion 156b with a smaller diameter, a body portion 157 provided with a protrusion 157a, and a gear portion 158. The smaller diameter portion 156b of the hollow cylindrical shaft 156 is rotatably fitted into the cylindrical rib 181 of the second housing 180.

The driving bevel gear 159 has a gear portion 159a, a knob 159b and a shaft 159c connecting the driving bevel gear portion 159a with the driving bevel gear knob 159b. The driving bevel gear portion 159a is engaged with the driven bevel gear portion 158 and the driving bevel gear knob 159b protrudes out from the second housing 180 so as to allow the knob to be manually twisted.

On the other hand, the connecting member 160 has a T-shaped tube 161 and a ring plate 164. The T-shaped tube 161 consists of a horizontal tube 162 for engaging with the first device 120 and a vertical tube 163 for engaging with the second device 150, and the ring plate 164 is formed with a recess 165 for engaging with the protrusion 157a of the driven bevel gear 155 and is tightly fitted around the vertical tube 163. The horizontal tube 162 is tightly fitted around the stationary rod 146 between the L-shaped pieces 147. The portion of the vertical tube 163 under the recess 165 is tightly fitted into the hollow cylindrical shaft 156 in such way that the recess 165 is secured with the protrusion 157a. This arrangement allows the engagement of the display panel 110 with the second device 150. Although only one protrusion and one recess are shown, one may just as easily provide a plurality of protrusions and, preferably, an identical number recesses, to secure the connecting member 160 to the driven bevel gear 155.

The operating principles of the tilting movement providing apparatus 100 will now be described in detail.

When the viewer rotates the pinion knob 127, its driving force is transmitted into the piece 147 via the pinion gear portion 126, the lower and the upper gear portion 138, 137 of the rack 135, the power conveying gear 141, the pair of driving gears 142 and the piece gear portion 147a, which, in turn, moves the display panel 110, thereby tilting the display panel 110 toward or away from the viewer.

When the viewer rotates the driving bevel gear knob 159b, its driving force is transmitted into the stationary rod 146 via the driving bevel gear portion 159a, the driven bevel gear portion 158, the protrusion 157a, the recess 165 of the ring plate 164 and the T-shaped tube, which, in turn, moves the first housing 170, thereby tilting the display panel 110 in sidewise rotational direction.

While the present invention has been described with respect to certain preferred embodiments only, other modifications and variations may be made without departing from the scope of the present invention as set forth in the following claims.

What is claimed is:

1. An apparatus comprising:
 a display panel;
 first means for tilting the display panel toward or away from a viewer, said first means being provided in a first housing and including an element for driving the display panel toward or away from the viewer and a unit for conveying a power from the driving element to the display panel, wherein the power conveying unit has a guide member, a rack coupled to the guide member and divided into an upper gear portion and a lower gear portion, a rotary rod rotatably fixed in the first housing, a power conveying gear and one or more driving gears fitted around the rotary rod in such a way that the power conveying gear is engaged with the upper gear portion of the rack, and a member for supporting the display panel, the supporting member having a stationary rod fixed in the first housing and an identical number of pieces for supporting the display panel as that of the driving gears, the piece rotatably fitted around the stationary rod and formed with a gear portion in such a way that said gear portion is engaged with its corresponding driving gear; and
 second means for rotating the display panel in sidewise directions.

2. The apparatus of claim 1, wherein the driving element is a pinion guided by the guide member of the power conveying unit, the pinion having a gear portion engaged with the lower gear portion of the rack, a first knob protruding out from the first housing so as to allow the first knob to be manually operated and a shaft connecting the gear portion with the first knob.

3. The apparatus of claim 1, wherein the second means is provided in a second housing and includes a second element for driving the display panel and a second unit for conveying a power from the second driving element to the display panel.

4. The apparatus of claim 3, wherein the second driving element is a driving bevel gear which has a driving bevel gear portion, a second knob protruding out from the second housing so as to allow the second knob to be manually operated and a shaft connecting the driving bevel gear portion with the second knob.

5. The apparatus of claim 4, wherein the second power conveying unit has a driven bevel gear and a member connecting the driven bevel gear with the display panel.

6. The apparatus of claim 5, wherein the driven bevel gear has a driven bevel gear portion engaged with the driving bevel gear portion, a body portion and a hollow cylindrical shaft for supporting the body portion, the hollow cylindrical shaft rotatably fixed in the second housing.

7. The apparatus of claim 6, wherein the connecting member is a T-shaped tube formed with a horizontal tube, the horizontal tube being tightly fitted around the stationary rod of the supporting member and a vertical tube, the vertical tube being tightly fitted into the hollow cylindrical shaft of the driven bevel gear in such a way that the connecting member rotates together with the driven bevel gear.

8. The apparatus of claim 7, wherein the vertical tube is provided with a ring plate formed with one or more recesses and the body portion of the driven bevel gear is provided with an identical number of protrusions as that of the recesses in such a way that recesses are engaged with its corresponding protrusion.

9. An apparatus comprising:

a display panel;

first means for tilting the display panel toward or away from a viewer, and second means for rotating the display panel in a sidewise direction; wherein the first means is provided in a housing and includes an element for driving the display panel toward or away from the viewer and a unit for conveying a power from the driving element to the display panel, said driving element being a pinion which has a gear portion, a knob protruding from the housing so as to allow the knob to be manually operated and a shaft connecting the gear portion with the knob; and the power conveying unit has a member for guiding the pinion, a rack divided into an upper gear portion and a lower gear portion engaged with the pinion gear portion, a rotary rod rotatably fixed in the housing, a power conveying gear and one or more driving gears fitted around the rotary rod in such a way that the power conveying gear is engaged with the upper gear portion of the rack and a member for supporting the display panel, the supporting member having a stationary rod fixed in the housing and identical number of pieces for supporting the display panel as that of the driving gears, the pieces rotatably fitted around the stationary rod and formed with a gear portion in such a way that said gear portion is engaged with its corresponding driving gear.

10. An apparatus comprising:

a display panel;

an element for driving the display panel; and a unit for conveying power from the driving element to the display panel, wherein the power conveying unit includes a driven bevel gear having a driven bevel gear portion, a body portion and a hollow cylindrical shaft for supporting the body portion, the hollow cylindrical shaft rotatably fixed in the housing, a member connecting the driven bevel gear with the display panel, and a member for supporting the display panel.

11. The apparatus of claim 10, wherein the driving element is a driving bevel gear which has a driving bevel gear portion engaged with the driven bevel gear portion, a knob protruding out from the housing so as to be manually operated and a shaft connecting the driving bevel gear portion with the knob.

12. The apparatus of claim 11, wherein the connecting member is a T-shaped tube formed with a horizontal tube and a vertical tube, the vertical tube being tightly fitted into the hollow cylindrical shaft of the driven bevel gear in such a way that the connecting member rotates together with the driven bevel gear.

13. The apparatus of claim 12, wherein the vertical tube is provided with a ring plate formed with one or more recesses and the body portion of the driven bevel gear is provided with an identical number of protrusions as that of the recesses in such a way that each recess is engaged with a corresponding protrusion.

14. The apparatus of claim 13, wherein the supporting member has a stationary rod fixed in the housing, the stationary rod fitting into the horizontal tube and a pair of supporting pieces tightly fitted around the stationary rod, each of the supporting pieces formed with one or more through holes for engagement with the display panel using an identical number set screws as that of the through holes.

15. An apparatus comprising:

a display panel;

an element for driving the display panel; and a unit for conveying power from the driving element to the display panel; wherein the driving element is a driving bevel gear which has a driving bevel gear portion, a knob protruding out from the housing so as to allow the knob to be manually operated and a shaft connecting the driving bevel gear portion with the knob;

the power conveying unit has a driven bevel gear, a member operatively connecting said driven bevel gear with the display panel; and the driven bevel gear has a driven bevel gear portion engaged with the driving bevel gear portion, a body portion, and a hollow cylindrical shaft for supporting the body portion, the hollow cylindrical shaft rotatably fixed in the housing.

16. An apparatus comprising:

a display panel;

first means for tilting the display panel toward or away from a viewer, and second means for rotating the display panel in a sidewise direction, wherein the second means is provided in a housing and includes an element for driving the display panel and a unit for conveying a power from the driving element to the display panel, said driving element comprising a driving bevel gear having a driving bevel gear portion, a knob protruding out from the housing so as to allow the knob to be manually operated, and a shaft connecting the gear portion with the knob, said unit for conveying a power comprising a driven bevel gear, a member for connecting the driven bevel gear with the display panel and a member for supporting the display panel, the driven bevel gear having a driven bevel gear portion engaged with the driving bevel gear portion, a body portion and a hollow cylindrical shaft rotatably fixed in the housing.

* * * * *